(No Model.)
R. HUMBLE & J. McLEOD.
CONNECTING ROD.
No. 366,725. Patented July 19, 1887.
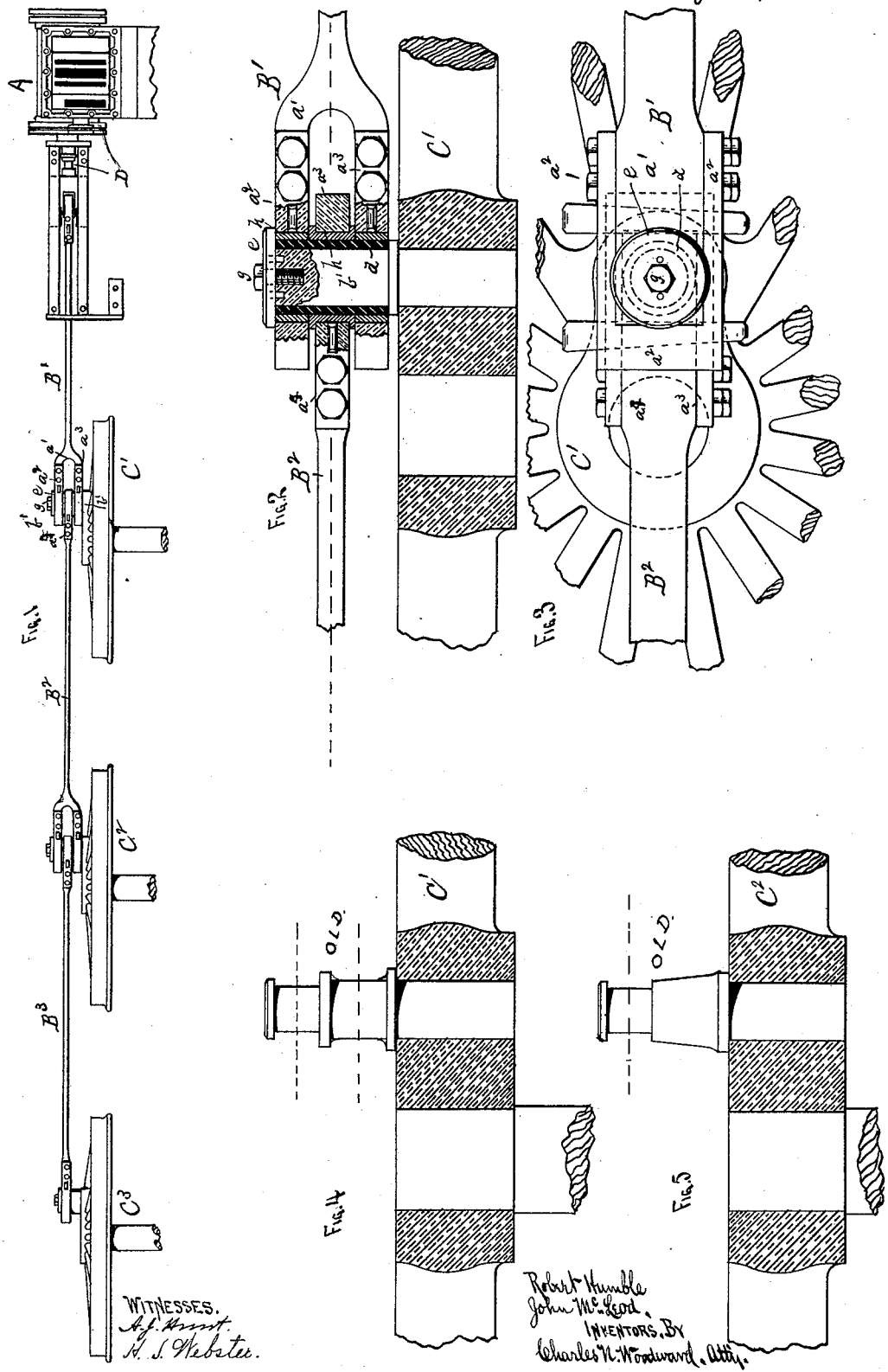

UNITED STATES PATENT OFFICE.

ROBERT HUMBLE AND JOHN McLEOD, OF ST. PAUL, MINNESOTA.

CONNECTING-ROD.

SPECIFICATION forming part of Letters Patent No. 366,725, dated July 19, 1887.

Application filed March 12, 1887. Serial No. 230,722. (No model.)

*To all whom it may concern:*

Be it known that we, ROBERT HUMBLE and JOHN MCLEOD, both citizens of the United States, both residing at St. Paul, in the county of Ramsey and State of Minnesota, have invented certain new and useful Improvements in Connecting-Rods of Locomotives, &c., of which the following is a specification.

This invention relates to the connecting-rods of locomotives and similar machinery; and it consists in the construction, whereby the lines of strain between the rods and crank-pins of the several driving-wheels are in the same vertical plane, and the side strains are avoided and wrenching strains minimized, as hereinafter shown and described, and specifically pointed out in the claim.

The invention also consists in the manner of forming the crank-pins with removable collars or sleeves, upon which all the wear and friction is borne, whereby the frequent renewal of the crank-pins is avoided, as hereinafter set forth, and specifically pointed out in the claim.

In the drawings, Figure 1 represents the outline of one of the cylinders and the driving-wheels of one side of a locomotive with our improved connection attached thereto. Fig. 2 is an enlarged sectional detail illustrating more fully the manner of construction. Fig. 3 is a front view of the parts shown in Fig. 2. Figs. 4 and 5 are enlarged details showing the front and rear crank-pins as ordinarily constructed.

The connecting-rods and coupling-rods of locomotives and similar machinery as ordinarily constructed, with one set outside of the other, necessitates the use of long crank-pins, thus locating the strains some distance away from the faces of the driving-wheels and subjecting the crank-pins and shafts to a severe wrenching-strain, which frequently breaks the crank-pins and bends and sometimes breaks the axles. To reduce these wrenching and other strains to a minimum is one of the objects of our invention, and is accomplished by forming each of the connecting and coupling rods with a forked or bifurcated end and arranging them upon the crank-pins with the forked end of one rod inclasping the closed end of the other contiguous rod on the same crank-pin, whereby the rods are all in line vertically and horizontally with the piston-rod and with each other, and the connections made with short crank-pins, so that the strains are equalized, side strains avoided, and the wrenching strains upon the crank-pins and axles reduced to a minimum.

In Fig. 1 we have shown an outline of a cylinder, A, of a locomotive, with the connecting-rod B', coupling-rods B² B³, connecting the driving-wheels C' C² C³ with the piston-rod D.

We have shown three driving-wheels coupled; but the invention will be equally applicable to a two or four wheel coupled locomotive.

The connecting-rod B' is formed with a bifurcated or forked end, a', having two strap-connections, a² a³, where it is connected to the crank-pin b' on the wheel C', and the connecting-rod B² is formed with a closed or ordinary strap-connection, a⁴, whereby it is connected to the same crank-pin b', between the straps a² a³, as shown. By this simple expedient the line of the coupling and connecting rods and the piston-rod are in the same vertical and horizontal plane; hence no side strains will result by the revolution of the wheels, and the wrenching force of the rapidly-revolving wheels is avoided, and the danger of the breakage of the crank-pins and bending and breaking of the axles nullified.

The crank-pins are shown surrounded by sleeves d, held in place by a disk, e, attached to the pin b' by a screw, g, the edges of the disk projecting beyond the brasses h of the couplings, and thereby serving as the shoulder to retain the couplings in place upon the pins. The disks thus serve a double purpose—viz., holding the sleeve upon the pins, and also holding the coupling upon the sleeve. All the wear and friction is thus borne by the sleeves and does not affect the crank-pins themselves, so that when the sleeves are worn out they can be readily replaced without disturbing the crank-pins. This is a very important feature of our invention, the great expense and annoyance caused by the necessity for the renewal of worn-out crank-pins being an important item in locomotive repair-shops. By our simple expedient we entirely avoid this wear and friction upon the crank-pins, so that one set of crank-pins will last as long as any other part of the locomotive.

We do not wish to be limited to the precise form of the parts shown, as we are aware that the invention may be applied to any form of connecting rod or strap.

If required, the bifurcations on the ends of the rods may be transposed without in any manner affecting the operations of the invention.

Having thus described our invention, what we claim as new is—

Drive-wheels and their crank-pins, in combination with the connecting and coupling rods connected to the crank-pins, said rods being formed with bifurcated and single ends, the bifurcated end of one rod straddling the single end of the adjacent rod, where they are connected to a crank-pin, substantially as set forth.

In testimony whereof we have hereunto set our hands in the presence of two subscribing witnesses.

ROBERT HUMBLE.
JOHN McLEOD.

Witnesses:
C. N. WOODWARD,
H. S. WEBSTER.